Figure 1:
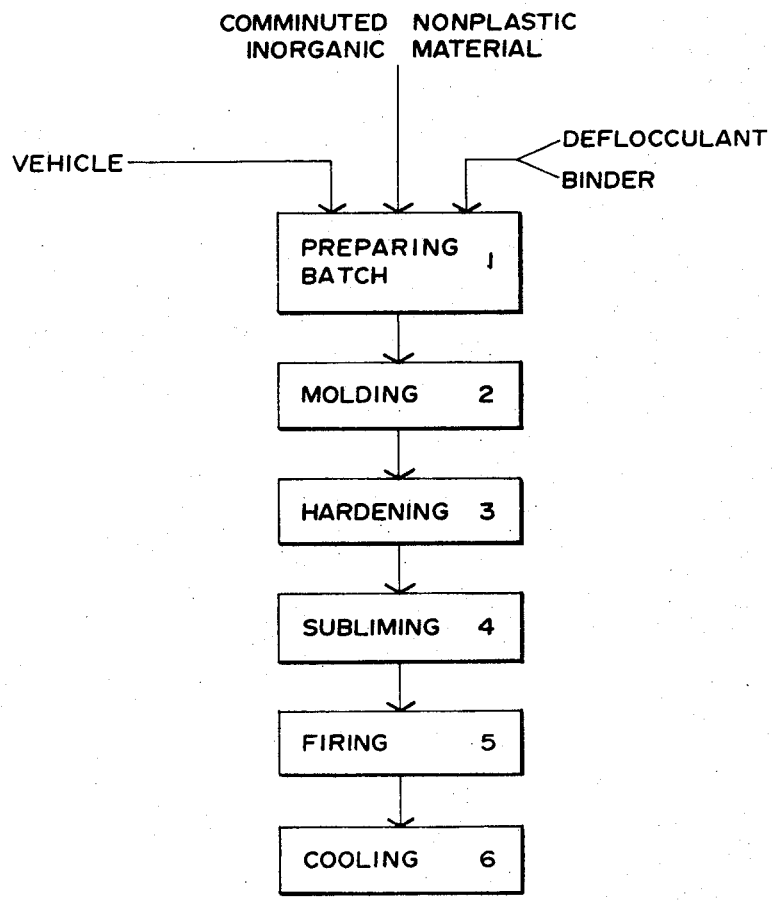

Oct. 10, 1967            E. A. BUSH            3,346,680

METHOD OF MOLDING COMMINUTED NONPLASTIC INORGANIC MATERIAL

Filed Jan. 26, 1965            2 Sheets-Sheet 2

INVENTOR
Edward A. Bush

BY

ATTORNEY 3,346,680
METHOD OF MOLDING COMMINUTED
NONPLASTIC INORGANIC MATERIAL
Edward A. Bush, Painted Post, N.Y., assignor to Corning Glass Works, Corning, N.Y., a corporation of New York
Filed Jan. 26, 1965, Ser. No. 428,114
9 Claims. (Cl. 264—44)

This invention relates to the formation of sintered articles having relatively low porosity from comminuted nonplastic inorganic materials, such as powders of ceramics, glass-ceramics, glasses, cermets, metals and mixtures of these materials. Its principal object is to provide a novel process and formulations of moldable batch mixtures for the economical production of such articles in large quantities and capable of being employed by any of the well-known molding techniques, such as pressing, injection, transfer, gravity or slip casting, dip casting, drain casting, extruding, rolling, spraying, spinning, and also by sealing together two or more "green" articles.

This invention more particularly relates to a process comprising the steps of: (1) preparing a novel molding batch mixture wherein comminuted nonplastic inorganic material is mixed with and dispersed in a fluid organic vehicle together with an organic deflocculant and (if desired) binder, (2) confining (molding) the fluid batch mixture to the desired shape (in a mold), (3) hardening (solidifying) the shaped mixture to a relatively rigid green body, (4) subliming the vehicle out of the body, (5) firing the green body to sinter and densify it into a strongly coherent article, and to substantially drive off the remaining organic components by oxidation and/or decomposition. As is common in the ceramics art, the term "green" is used throughout this specification to denote that state of the molded body where it has been hardened to a relatively rigid state, but it has not yet been fired to a strongly coherent sintered state.

One unique feature of this invention is the formulation of the molding batch mixture.

The organic vehicle is so chosen: (1) that it is a solid at room temperature and capable of being rendered fluid by heating or melting at relatively low temperature to provide the primary component for suitable fluidity or moldable consistency to the batch mixture for the desired molding technique utilized, (2) that upon confining the fluid batch mixture to the desired shape (in a mold), it can be quickly resolidified by cooling no lower than normal room temperature thereby hardening the shaped mixture to a rigid body, and that it can be readily and relatively quickly removed from the body by sublimation (by virtue of its high solid state vapor pressure) at a temperature from room temperature up to its melting point without causing distortion, sagging or cracking in the body.

The organic defloccuiant in an important and essential feature of this invention. It must be substantially soluble in the vehicle and possess the characteristic defloccuiating ability of reducing the viscosity, or of thining of the consistency of the fluid batch mixture according to this invention whereby the amount of comminuted nonplastic inorganic material can be greatly maximized to a degree where the batch mixture would otherwise be too thick, viscous or of an unmoldable consistency if the organic defloccuiant was omitted. By virtue of the presence of the organic deflocculant in the batch mixture, enough comminuted nonplastic inorganic material can be "loaded" or mixed into the moldable batch mixture to constitute the major (by weight) component thereof, and the amount of the other components, that are subsequently removed, can be kept low thereby yielding a minimum amount of porosity in the green state and a minimum amount of firing shrinkage. This, of course, ultimately provides sintered bodies with relatively low porosity and final dimensions more closely conforming to the green state dimensions thereby making unnecessary or minimizing costly and time consuming finishing operations.

A small amount of organic binder is usually included in the batch mixture to provide handling strength to the green bodies, which would otherwise generally be too fragile for commercial production processes handling. Any one of the number of well-known organic binders commonly used heretofore in processes of molding comminuted nonplastic inorganic materials can be used. The amount of binder required is quite small and, as a result, it is possible to avoid the difficulties that may occur with larger amounts, namely, time-consuming burn out, higher porosity, cracking and/or distortion. Generally the amount of binder can be kept lower than 2–3 percent by weight of the total batch mixture while providing adequate green or handling strength.

Figure 2:
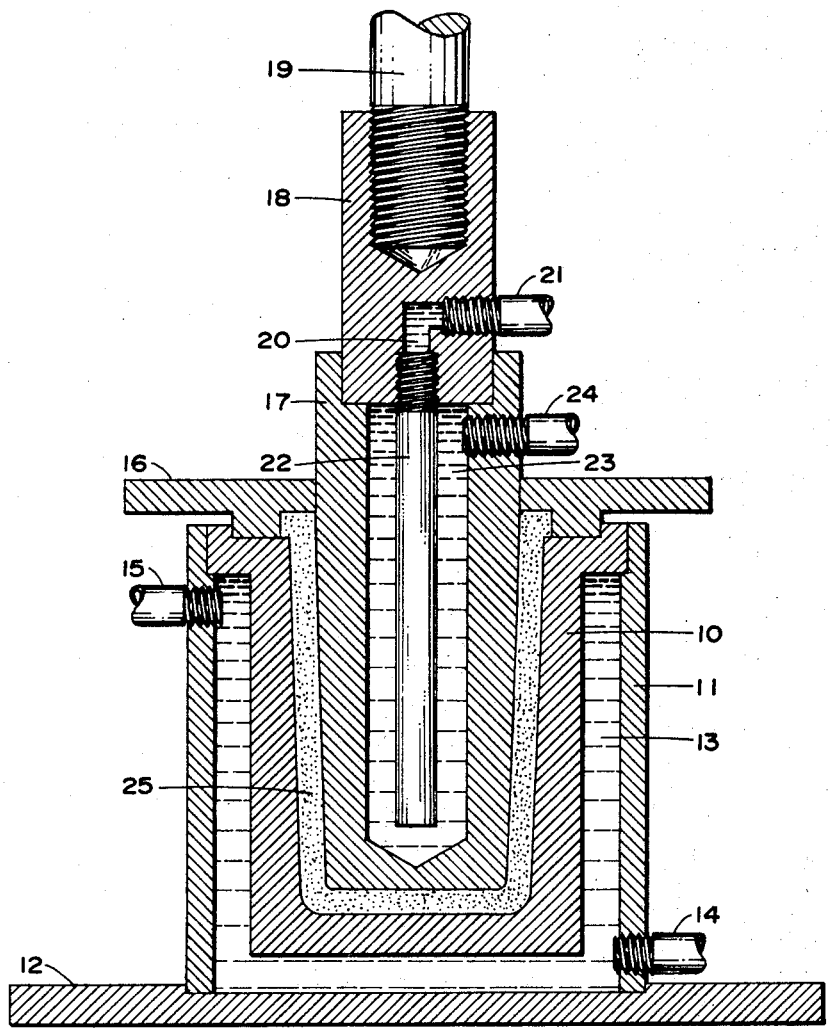

The invention will now be described in greater detail with reference to the accompanying drawings in which:

FIGURE 1 is a flow sheet diagram illustrating the general steps of the process according to this invention, and FIGURE 2 is a cross-sectional view of a water-cooled molding press at the stage of having fully molded a batch mixture into the form of a crucible and utilized to illustrate one molding technique for carrying out the present invention.

Referring to FIGURE 1, step 1 of the process involves preparing the batch mixture. This step basically involves mixing all the components together and heating the resultant batch mixture to render the vehicle fluid. While they may be premixed before melting the vehicle, it is preferred for optimum dispersion and uniformity of mixing to first melt the vehicle, then begin constant stirring of the melted vehicle, next add the deflocculant and then add the comminuted nonplastic inorganic material. The binder can be added at any stage as desired. The maximum "loading" of any comminuted nonplastic inorganic material can be easily determined preliminarily by making up a small test batch mixture by alternately adding the inorganic material and the deflocculant until the batch mixture becomes too thick or viscous for molding consistency, as determined by the difficulty in stirring or by a viscosity meter, and further addition of deflocculant fails to thin out the mixture or render it more fluid again. Thus, the component proportions before the last inorganic material addition give the approximate maximum "loading" of the inorganic material.

It has been found that the rate of stirring, or more specifically the rate of shear in stirring, can have a noticeable effect on maximum "loading" of the inorganic powder material. High rates of shear, such as with high speed propellor mixers, tend to provide lower viscosities than for the same batch mixture stirred at lower rates of shear, e.g. hand-spatula stirring. It appears that the higher shear rates cause more complete breakdown and dispersion of small agglomerates of inorganic powder particles in the mixture. Thus, with high speed-high shear rate mixing, the maximum amount of inorganic material "loading" can be further increased to some degree while still providing moldable consistency.

The choice of nonplastic inorganic material is generally unlimited in the categories of materials mentioned above. While clay materials are of the plastic type of inorganic materials, small amounts that are normally insufficient to provide moldable plasticity to the batch mixture may be added to certain ceramic batches to provide desired properties to the sintered body. The degree of comminution and the particle size distribution of the nonplastic inorganic materials are those commonly used for such molding powders, depending primarily upon the particular inorganic material and the properties desired in the sintered body, as is well known in the art. Generally, for optimum density, the maximum particle size is about 200 Tyler mesh (and preferably less than 325 Tyler mesh), although suitable bodies can be made with maximum particle sizes as large as 20 Tyler mesh for one fraction of the nonplastic inorganic material. Hence, the process of this invention is not critically dependent upon a certain degree of fineness of the inorganic powder so long as it is in the known realm of sizes to produce strong, relatively dense, coherent sintered bodies.

The organic vehicle for the batch mixture formulation of this invention has been determined to be any organic material that is solid at normal room temperatures and pressures, that has a melting point below about 200° C. and that has a vapor pressure of at least 1 mm. of Hg at its melting point under normal ambient atmospheric pressure of substantially one atmosphere. Such organic materials have vapor pressures in the solid state at temperatures below their melting point sufficiently high so as to be readily and quickly sublimed at such temperatures. Some of these organic materials may be undesirable because of cost or toxicity problems, but among those not subject to such objectionable features are the exemplary materials listed in Table I, which were determined to be suitable in the process of this invention.

TABLE I

| Vehicle | Formula | Melting Temp., °C. | Vapor Pressure (mm. Hg) at Melting Temp. |
|---|---|---|---|
| Paradichlorobenzene | $C_6H_4Cl_2$ | 53 | 9.0 |
| Chloroacetic acid | $C_2HCl_3O_2$ | 50–63 | 3.9 |
| Naphthalene | $C_{10}H_8$ | 80 | 7.0 |
| Benzoic acid | $C_7H_6O_2$ | 121 | 6.2 |
| Phthalic anhydride | $C_8H_4O_2$ | 131 | 6.8 |
| Camphor | $C_{10}H_{16}O$ | 177–8 | ~350–360 |

Because of the very high vapor pressures of camphor, batch mixtures with this vehicle are best prepared in a closed chamber and molded in a closed system, e.g. in an injection molding apparatus, in order to minimize the loss of camphor from the mixture. In any event, it may be desirable to carry out the subliming step of the process beneath a hood and duct system for safety and/or reclaiming the vapors of the vehicle used.

One important discovery that has made the present invention possible is that certain organic materials are capable of acting as a deflocculant in the batch mixtures having the organic vehicles described above. These materials possess two essential characteristics that have been found to be necessary for functioning as a deflocculant: substantial solubility in the vehicle and being substantially free of water. Other materials not possessing these two characteristics have been found to lack the deflocculating capability in the vehicles according to this invention. It should be noted that any substantial addition of water to the batch mixtures tends to detrimentally thicken the mixture consistency and, therefore, such additions should be avoided. While one particular deflocculant may not work as well with one particular comminuted nonplastic inorganic material as with another comminuted nonplastic inorganic material, an appropriate moldable consistency for any desired combination of comminuted nonplastic inorganic material, molding technique and sintered body characteristics can be readily provided as a result of the variation in degree of deflocculating ability of the various suitable organic deflocculants. Thus, this variation makes it possible to tailor the batch mixture formulation as desired by selection of the deflocculant to meet the needs of any particular molding technique in producing any particular sintered inorganic material body.

The suitable organic deflocculants according to my invention are the saturated and unsaturated monohydric alcohols (primary alcohols) containing at least eight carbon atoms. A number of these higher alcohols, especially the saturated ones, are waxy solids at ordinary room temperatures. High purity grades of these alcohols are not necessary since the less pure, less expensive, ordinary commercial or technical grades have been found very suitable. Examples satisfactorily tested in batch mixtures containing paradichlorobenzene and the noted nonplastic inorganic material are shown in Table II. The melting points are for high purity alcohols.

The identification of the symbolically designated nonplastic inorganic materials in Table II are listed in Table III.

As noted above, the organic binder can be any one of the materials commonly used for this function. Examples of such materials are: carnauba wax, polymethyl methacrylate resins, polyethylene glycols with average molecular weight ranging from 3000 to 20,000, polyvinyl acetate resins, unoxidized and oxidized microcrystalline waxes, styrene resins with average molecular weights of 1500 or more, chlorinated naphthalene and polyvinyl alcohol resin. Polyethylene glycols are especially desirable in view of their additional ability to remarkably improve the plasticity of the moldable batch mixtures, which ability is not apparent in the other noted binders.

TABLE II

| Alcohol | Formula | Melting Point, °C. | Ceramic |
|---|---|---|---|
| 1-octanol (n-octyl) | $CH_3(CH_2)_7OH$ | −16.3 | GM |
| 1-dodecanol (lauryl) | $CH_3(CH_2)_{11}OH$ | 24 | AGM |
| 1-tetradecanol (myristyl) | $CH_3(CH_2)_{13}OH$ | 37.6 | AGM |
| 1-hexadecanol (palmityl or cetyl) | $CH_3(CH_2)_{15}OH$ | 49.3 | AGM |
| 1-octadecanol (stearyl) | $CH_3(CH_2)_{17}OH$ | 59 | AGM |
| 9-octadecen-1-ol, cis | $CH_3(CH_2)_7CH:CH(CH_2)_8OH$ |  | AGM |

TABLE III

| Symbol | Nonplastic Inorganic Material |
|---|---|
| A | Alumina, particle size 1–40 microns (avg. 6 microns). |
| G | Borosilicate glass, particle size 0.5–55 microns (avg. 17 microns), composed of (by weight) 79.2% $SiO_2$, 18.4% $B_2O_3$, 2.4% $K_2O$. |
| M | Calcined magnesite, particle size 1–70 microns (avg. 16 microns). |

Again referring to FIGURE 1, after an appropriate moldable batch mixture has been prepared, the molding step 2 is accomplished by subjecting the mixture to the desired molding technique followed by the hardening or cooling step 3 to rigidify the mixture in the shape desired. These two steps can be illustrated by reference to FIGURE 2. The latter figure shows a simple mold press comprising a metal mold 10 supported within a housing consisting of cylindrical shell 11 and base 12. The mold 10, shell 11 and base 12 are fastened together to form a watertight chamber 13. Shell 11 is provided with a water inlet 14 near the base 12 and a water outlet near the upper portion of shell 11. By this means, water can be circulated through chamber 13 to cool mold 10 and thereby cause the cooling and hardening of the molded mixture 25 to the required shape as a result of the solidification of the vehicle in the mixture.

A mold cover 16 is provided on top of mold 10 to assist in forming the upper portions of the shaped mixture 25. Cover 16 is provided with a central opening into which a hollow tapered plunger 17 can descend and so designed that when plunger 17 reaches its proper lowermost position during the molding step 2, there is no substantial space between the central opening wall on cover 16 and the plunger 17 so as to prevent the mixture 25 from oozing out of the molding chamber. Plunger 17 is rigidly attached in a watertight manner to coupling member 18 to form a chamber 22 for cooling water. Member 18 is attached to shaft 19, which in turn is operatively connected to an air cylinder (not shown) for raising and lowering the combination assembly of plunger 17, member 18 and shaft 19. Member 18 is provided with a water passage 20 connecting a water inlet 21 and a pipe 22, the latter extending down into chamber 23 to provide adequate water circulation therein. Plunger 17 is provided with a water outlet 24 near its upper portion that remains above cover 16 during the pressing stage.

In operation, the plunger 17 is initially in a raised position above the mold 10 and cover 16 is put in place. Tap water is caused to flow through inlet 14-chamber 13-outlet 15 and through inlet 21-passage 20-pipe 22-chamber 23-outlet 24. An appropriately measured quantity of moldable batch mixture 25, containing the vehicle in melted condition, is poured into the lower part of the cavity of mold 10 and immediately thereafter the plunger 17 is brought down to its lowermost position (as shown in FIGURE 2), forcing the moldable batch mixture 25 to fill the upper part of the cavity formed by mold 10, plunger 17 and cover 16. The plunger 17 is held in this position for a short time of a minute or more (depending upon the thickness of the molded mixture 25) until the vehicle in the mixture 25 solidified to rigidify the molded body. Then the plunger 17 is raised, the cover 16 is removed and the molded mixture (green body) 25 is lifted out of the mold.

The above procedure tends to form minor chill wrinkles on the outer surface of the green body at the level of the initial poured fill of batch mixture in the lower part of the mold. When this chill wrinkle is objectionable, it can be eliminated by initially heating the mold 10 to a temperature near the melting point of the vehicle, pressing and then cooling the mold members to solidify the mixture 25. With paradichlorobenzene used as the vehicle, hot water at about 40° C. can be circulated through chamber 13 for suitable heating of the mold.

When both the plunger 17 and the mold 10 are water-cooled with tap water during pressing, the mixture 25 solidifies from both surfaces toward the center. With a vehicle, such as paradichlorobenzene, having high volume shrinkage during solidification, a parting line or zone of weakness tends to develop in the central portion of the green body wall which is deficient in vehicle. If this objectionably lowers handling strength, this parting line can be eliminated by cooling from one surface while the other surface is initially held above the melting point of the vehicle and then slowly cooling this other surface. Generally, this parting line in the green body (because of vehicle deficiency) has no substantial adverse effect on the sintered body.

Normally, when the mold 10 and plunger 17 are cooled with tap water throughout the molding and hardening steps, the molded mixture 25 shrinks free of the mold members thereby facilitating easy removal. However, when the mold is heated during forming to 40° C. to eliminate chill wrinkles in a paradichlorobenzene-containing mixture and then cooled to solidify the mixture, the mold shrinks along with the molded mixture and sticking difficulty is experienced in removing the green body. This problem can be avoided by maintaining tap water cooling of the mold 10, but locally heating its inside surface prior to pouring the mixture. This procedure eliminates the chill wrinkles and sticking in the mold. Notably, naphthalene-containing mixtures normally shrink free of the mold even when the mold temperature is 70° C. during forming.

As an alternative, or supplementary, solution to the sticking problem, suitable mold release agents can be applied to the molding surfaces of the mold members. Good results have been obtained with a 1:5 (by volume) mixture of oleic acid and kerosene, and with glycerine mixed with a 10% (by volume) water solution containing 10% Aerosol OT in order to prevent the glycerine from "beading up" on the molding surfaces.

After removal of the green body from the mold, it is then subjected to the subliming or "drying" step 4. This is accomplished either by allowing normal sublimation or "evaporation" of the vehicle to occur in open air at room temperature or, for more rapid processing, by heating the green body to a temperature below the melting point of the vehicle so as to avoid melting the organic components, which would otherwise tend to cause sagging and/or distortion of the green body. The time required for substantially complete sublimation removal of the vehicle varies with the thickness of the green body. Generally, with heating at about 10° C. below the melting point of the vehicle and good air circulation around the green body, the time for satisfactory removal of the vehicle can be as low as about 4 hours for $1/16''$ thickness and about 72 hours for $1/2''$ thickness. Further decrease in "drying" time may be obtained with forced air circulation or reduced ambient pressure in the "drying" chamber or oven.

Upon completion of the sublimation step 4, the green body is then subjected to the firing step 5 and subsequently the cooling step 6. The firing and cooling schedules of temperature and time are those commonly known or suitably appropriate for the particular comminuted nonplastic inorganic material employed in the process.

The invention will now be illustrated by the following three examples.

*Example 1*

A porcelain molding batch is prepared by melting the vehicle and then adding in the other components, by stirring with a propellor mixer while heating in the range of 70–80° C., of the following mixture:

|  | Gm. |
|---|---|
| High alumina porcelain, 1–14Δμ (ave. 5μ) (composed of, by weight, 91.61% $Al_2O_3$, 3.57% $CaCO_3$, 4.82% $SiO_2$) | 600 |
| Paradichlorobenzene | 146 |
| 1-tetradecanol (technical grade) | 18 |
| Carbowax 4000 | 6 |

The Carbowax 4000 binder is a water-soluble, waxy solid polyethylene glycol having an average molecular weight of 3000–3700, and it is soluble in the melted paradichlorobenzene. The porcelain ceramic comprises 60% by volume of the batch mixture. A measured quantity of the mixture is poured into the tap water-cooled steel crucible mold shown in FIGURE 2, and the plunger is pressed down and held for about a minute. After retracting the plunger, the resulting molded green crucible can be lifted from the mold, "dried" at 40° C. until substantially all the paradichlorobenzene has been sublimed, and then fired at 1620° C. for two hours to yield an impervious, strongly coherent sintered crucible.

*Example 2*

A molding batch mixture as in Example 1 was formed into rods by transfer molding at 5000 p.s.i. pot pressure. The green rods were then "dried" at 40° C. for two days, during which time the paradichlorobenzene was removed by sublimation. After firing at 1620° C. for two hours, the "dried" rods were strongly sintered and impervious to water absorption. They had a density of 3.39 gm./cc., a modulus of rupture (in flexure) of 38,000 p.s.i. and a linear firing shrinkage of 15.34%.

Example 3

An alumina molding batch, processed as in Example 2, consisted of:

|  | Gm. |
|---|---|
| Alumina, 1–40μ (ave. 6μ) | 600 |
| Paradichlorobenzene | 146 |
| 1-octadecanol (technical grade) | 18 |
| Carbowax 4000 | 6 |

The alumina comprised 60% by volume of the batch mixture. The fired rods had the following properties: 6.64% linear firing shrinkage, 2.54 gm./cc. density, 13.9% water absorption and 11,900 p.s.i. modulus of rupture (in flexure).

Other molding batch mixtures that have been found suitable for processing into satisfactory fired bodies are set forth in Table IV. The grades of the alcohols are designated by (T) for technical grades and (HP) for higher purity grades. The amounts of alcohol are in percent by weight of the comminuted inorganic material portion of the batch mixtures and the amounts of inorganic material are in percent by volume of the whole batch mixture. The symbolically designated inorganic materials are identified in Table III. In all cases the balance of the mixtures was made up of paradichlorobenzene without any binder. However, if desired, other vehicles (e.g. naphthalene) and/or also a binder can be included. Generally speaking, alcohol concentrations of at least about 1% by weight of the inorganic material or greater are usually required for satisfactory deflocculation.

TABLE IV

| Primary Alcohol | Wt. Percent Alcohol | Inorganic Material | Vol. Percent Inorganic |
|---|---|---|---|
| 1-octanol (T) | 2,4 | M | 50 |
| Do | 4 | G | 60 |
| 1-dodecanol (T) | 2,4 | A | 50 |
| Do | 4 | M | 50 |
| 1-dodecanol (HP) | 2,4 | A | 50 |
| 1-tetradecanol (T) | 2,4 | A | 50 |
| Do | 4 | A | 60 |
| Do | 2,4 | M | 50 |
| Do | 4 | G | 60 |
| 1-tetradecanol (HP) | 4 | A | 50 |
| Do | 4 | M | 50 |
| Do | 4 | G | 60 |
| 1-hexadecanol (T) | 1,2,4 | A | 50 |
| Do | 4 | A | 55 |
| Do | 2,4 | M | 50 |
| Do | 2,4 | G | 60 |
| 1-hexadecanol (HP) | 2,4 | A | 50 |
| Do | 4 | A | 60 |
| 1-octadecanol | 2,4 | A | 50 |
| Do | 4 | A | 60 |
| Do | 2,4 | M | 50 |
| Do | 4 | G | 60 |
| 9-octadecen-1-ol, cis | 4 | A | 50 |
| Do | 1,2,4 | M | 50 |
| Do | 2,4 | G | 50 |

I claim:
1. The process of making sintered articles from comminuted nonplastic inorganic material comprising the steps of:
   (a) preparing a molding batch mixture consisting of comminuted nonplastic inorganic material as a major component by weight thereof, a melted organic vehicle that is solid at normal room temperature and pressure, said vehicle having a melting point below about 200° C. and having a vapor pressure of at least about 1 mm. of Hg at the melting point of said vehicle under ambient atmospheric pressure of substantially one atmosphere, and an organic deflocculant selected from monohydric alcohols containing at least eight carbon atoms,
   (b) molding said mixture, while said vehicle remains melted, to the desired shape,
   (c) cooling said molded mixture to solidify said vehicle and harden the mixture into a rigidified green body,
   (d) subliming said vehicle from said green body, and
   (e) firing said green body to sinter the nonplastic inorganic material into a coherent body.
2. The process of claim 1 wherein a small amount of organic binder is added to said batch mixture to subsequently provide greater handling strength in said green body.
3. The process of claim 1 wherein said vehicle is paradichlorobenzene.
4. The process of claim 1 wherein said vehicle is naphthalene.
5. The process of claim 1 wherein said organic deflocculant is selected from saturated monohydric alcohols containing at least eight carbon atoms.
6. The process of claim 1 wherein said organic deflocculant is selected from unsaturated monohydric alcohols containing at least eight carbon atoms.
7. The process of claim 1 wherein said monohydric alcohol contains not more than eighteen carbon atoms.
8. The process of claim 1 wherein the said monohydric alcohols are primary alcohols.
9. The process of claim 2 wherein the amount of organic binder is less than 3% by weight of the total batch mixture.

References Cited

UNITED STATES PATENTS

| 2,422,809 | 6/1947 | Stupakoff et al. | 264—63 X |
| 3,234,308 | 2/1966 | Herrmann | 264—63 |

FOREIGN PATENTS

| 137,807 | 9/1948 | Russia. |

OTHER REFERENCES

German printed application 1,093,280, November 1960.

ROBERT F. WHITE, *Primary Examiner.*

J. A. FINLAYSON, *Assistant Examiner.*